United States Patent
Kashiwagi

(10) Patent No.: US 9,674,393 B2
(45) Date of Patent: Jun. 6, 2017

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Masaki Kashiwagi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/630,350

(22) Filed: Feb. 24, 2015

(65) Prior Publication Data

US 2015/0242719 A1    Aug. 27, 2015

(30) Foreign Application Priority Data

Feb. 25, 2014  (JP) .................................. 2014-034457

(51) Int. Cl.
*G06K 15/00*   (2006.01)
*H04N 1/32*    (2006.01)

(52) U.S. Cl.
CPC .............................. *H04N 1/32464* (2013.01)

(58) Field of Classification Search
USPC ............. 358/1.12, 474, 468, 500, 401, 1.16
See application file for complete search history.

(56) References Cited

U.S. PATENT DOCUMENTS

| | | | | |
|---|---|---|---|---|
| 5,677,776 A | * | 10/1997 | Matsuda | H04N 1/38 355/25 |
| 8,125,693 B2 | * | 2/2012 | Arai | H04N 1/00803 358/1.13 |
| 2003/0193534 A1 | * | 10/2003 | Moriyama | G06K 15/10 347/5 |
| 2010/0165405 A1 | * | 7/2010 | Okumura | H04N 1/00572 358/1.16 |
| 2011/0211238 A1 | * | 9/2011 | Sahara | H04N 1/203 358/498 |
| 2013/0208999 A1 | * | 8/2013 | Miyata | H04N 1/3873 382/309 |

FOREIGN PATENT DOCUMENTS

| | | |
|---|---|---|
| JP | 2008-118565 A | 5/2008 |
| JP | 2010-041541 A | 2/2010 |

* cited by examiner

*Primary Examiner* — Jerome Grant, II
(74) *Attorney, Agent, or Firm* — Canon U.S.A., Inc. IP Division

(57) ABSTRACT

An image forming apparatus includes a reception unit configured to receive image data obtained by reading the document by a first reading unit or a second reading unit, a storage unit configured to store the image data received by the reception unit, a determination unit configured to, while the reception unit is receiving the image data of the document obtained by the first reading unit, determine whether the second side is a blank page from the image data of the document read by the second reading unit, and a control unit configured to, in a case where the determination unit determines that the second side is a blank page, control the reception unit not to reserve a storage area for storing the image data of the document read by the second reading unit in the storage unit.

5 Claims, 14 Drawing Sheets

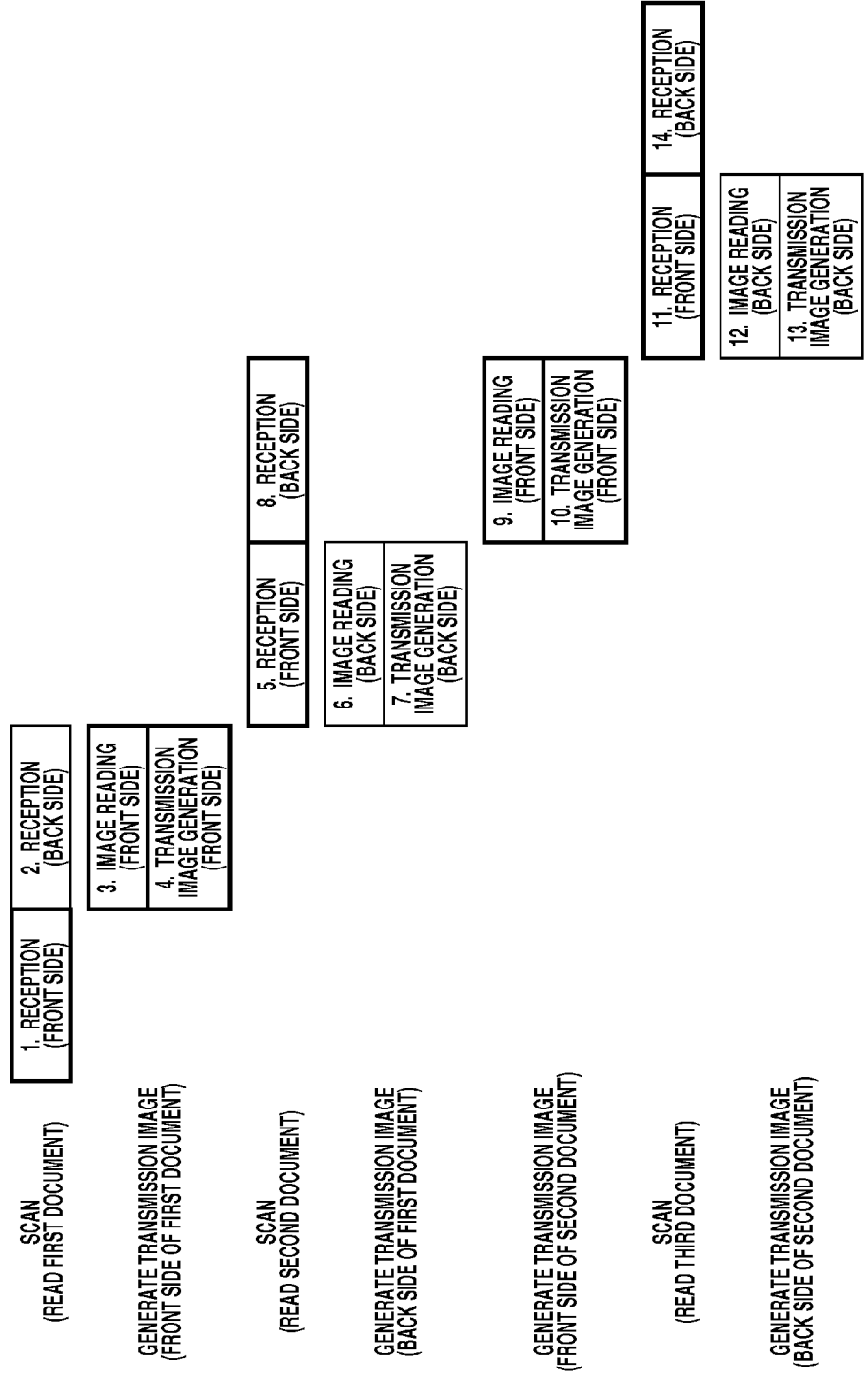

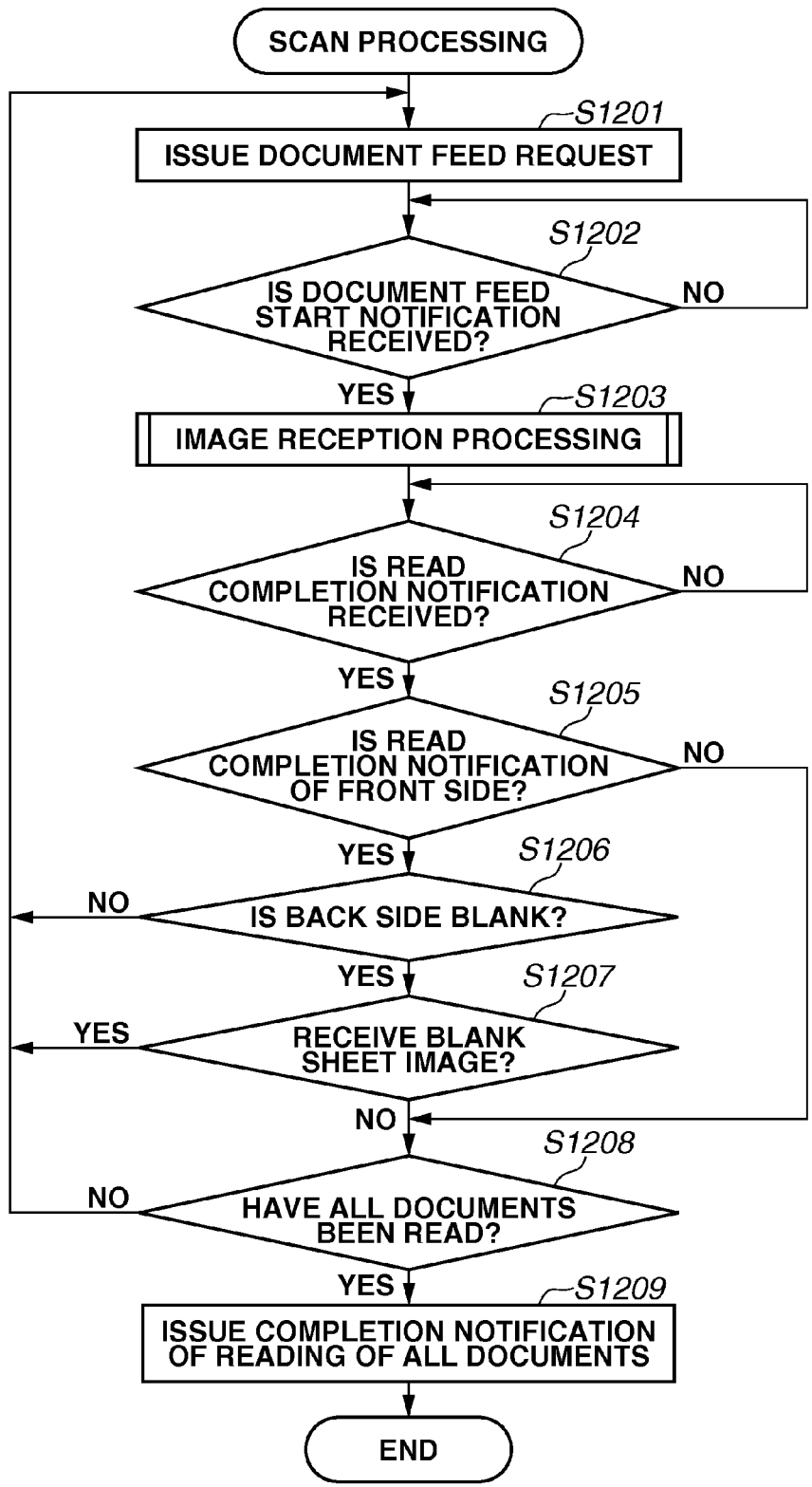

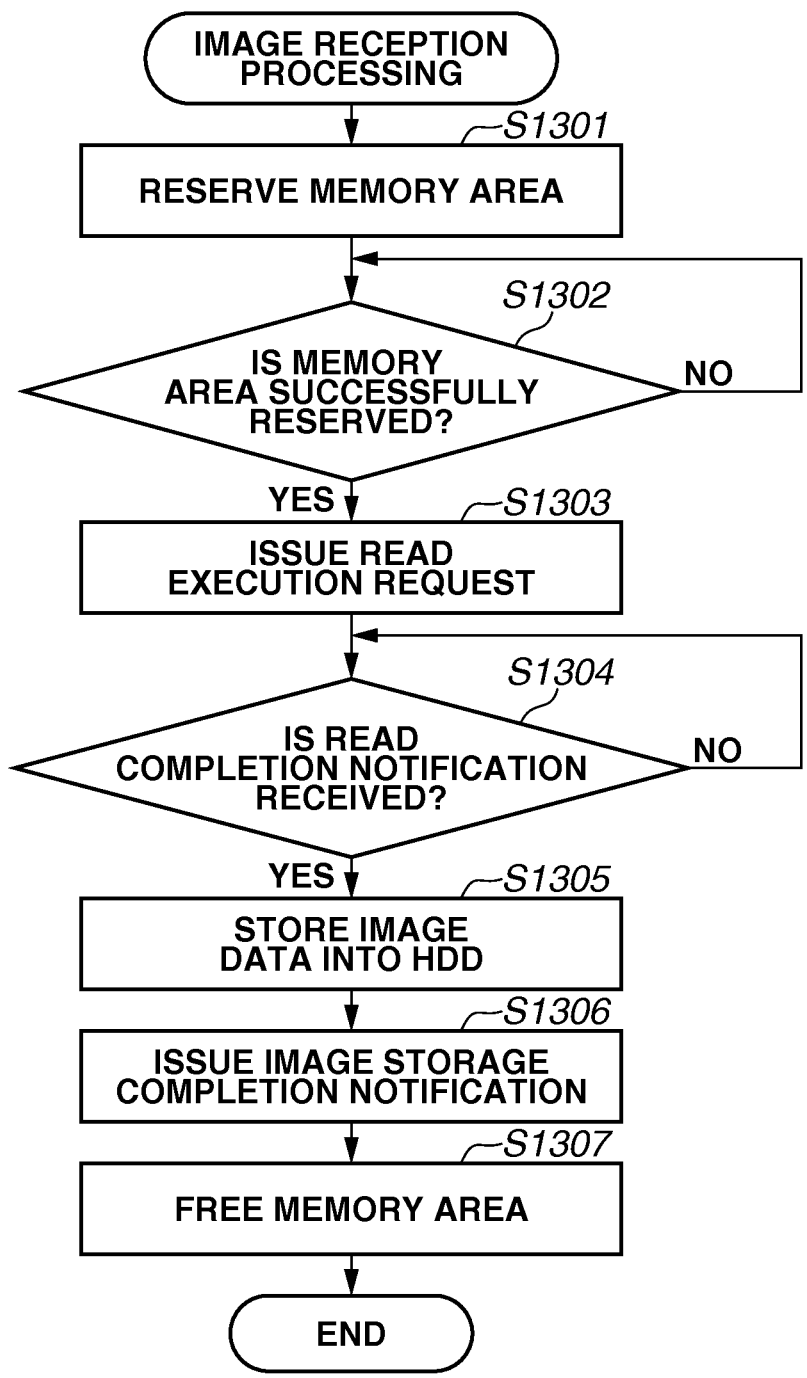

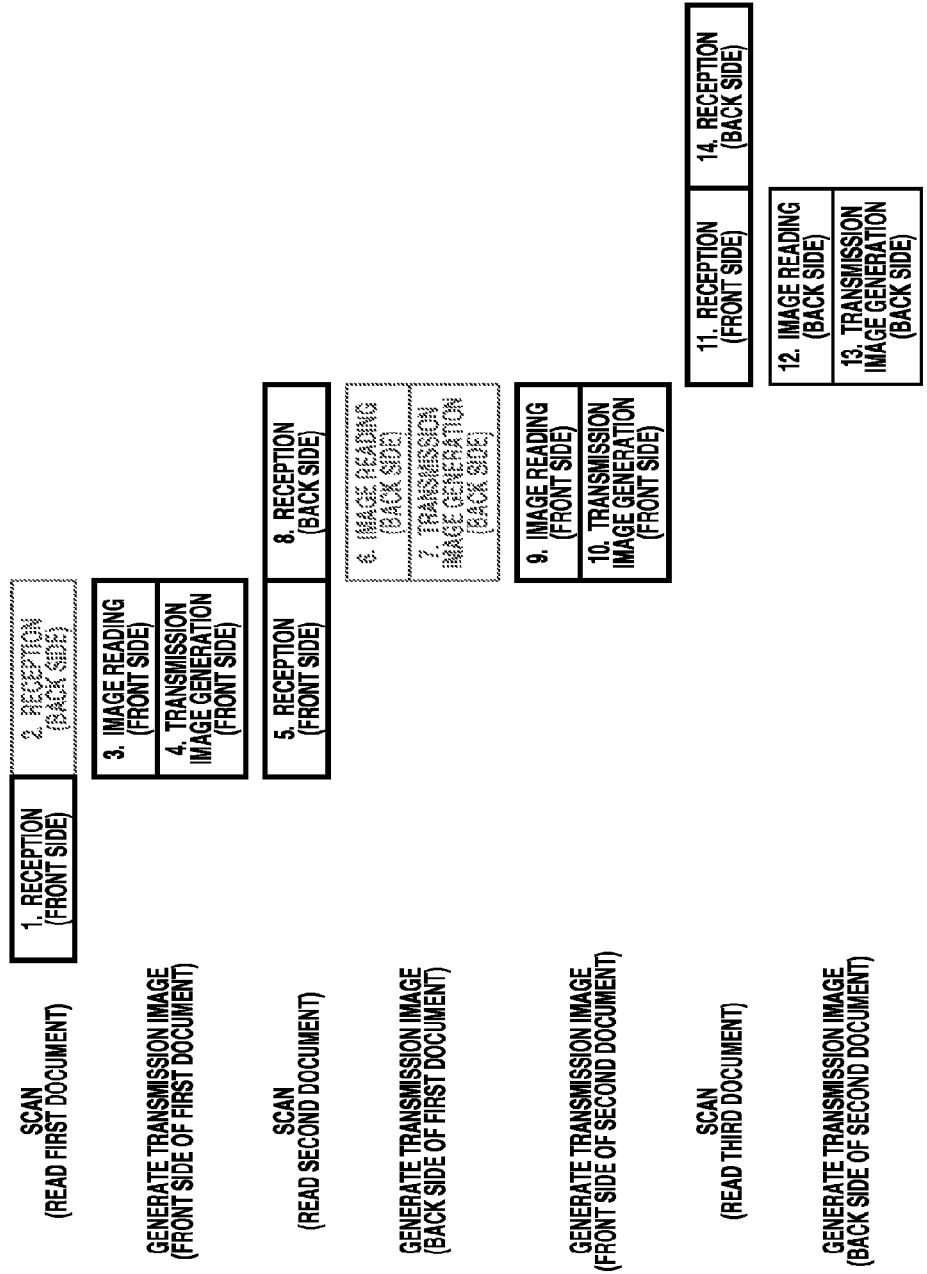

# IMAGE FORMING APPARATUS, METHOD FOR CONTROLLING IMAGE FORMING APPARATUS, AND STORAGE MEDIUM

BACKGROUND OF THE INVENTION

Field of the Invention

The present invention relates to an image forming apparatus, a method for controlling the image forming apparatus, and a storage medium.

Description of the Related Art

There is an image reading apparatus that conveys a document from an automatic document feeder (ADF) and reads an image of the conveyed document. There is a multifunction peripheral on which a plurality of functions, such as a copying, a printer, a facsimile, and a scanner, is installed. There is an image reading apparatus that uses an ADF and reads images on front and back sides of a two-sided document by using separate reading units. Such an image reading apparatus can be used to read documents more quickly because the image reading apparatus does not need to reverse the front and back sides of the documents.

Concerning an image reading apparatus configured as described above, Japanese Patent Application Laid-Open No. 2008-118565 discusses a technique in which in a case where a document to be read includes a sheet of which back side is blank, the image reading apparatus accepts a user's operations for deleting a blank page after the document is read.

Japanese Patent Application Laid-Open No. 2010-041541 discusses a technique for determining output of image data to an output unit with respect to each of the blank sheet determination results of the front and back sides and automatically removing a blank page to reduce a user's operation for deleting the blank page.

It takes a lot of operations and is troublesome for the user to remove blank pages from a document after the document is set and read on the ADF. In addition, controlling handing of a blank page all the time is inefficient in implementing a plurality of functions with limited memory resources. A resulting delay in cooperation between the functions can stress out the user.

If a blank page is automatically removed, the blank page is skipped at the time of two-sided printing, for example. This causes the problem that a different product is produced even if the user wants to make an exact copy of the document.

An image forming apparatus may include a configuration in which images on both sides of a document are almost simultaneously read while the document is conveyed. In such an image forming apparatus, even if a first side of the document is read and detected to be a blank page, a second side is read and subjected to the processing for detecting a blank page.

The processing for reading both sides of a document therefore always needs to reserve a memory area for storing two pages of document images. There has also been a problem of a delay in subsequent processing due to the blank sheet detection on both sides of the document.

SUMMARY OF THE INVENTION

According to an aspect of the present invention, an image forming apparatus includes a first reading unit configured to read a first side of a document conveyed, a second reading unit configured to read a second side of the document conveyed, a reception unit configured to receive image data obtained by reading the document by the first reading unit or the second reading unit, a storage unit configured to store the image data received by the reception unit, a determination unit configured to, while the reception unit is receiving the image data of the document obtained by the first reading unit, determine whether the second side is a blank page from the image data of the document read by the second reading unit, and a control unit configured to, in a case where the determination unit determines that the second side is a blank page, control the reception unit not to reserve a storage area for storing the image data of the document read by the second reading unit in the storage unit.

Further features of the present invention will become apparent from the following description of exemplary embodiments with reference to the attached drawings.

BRIEF DESCRIPTION OF THE DRAWINGS

FIG. 11 is a diagram schematically illustrating a state of memory management.

FIG. 12 is a flowchart for describing the method for controlling the image forming apparatus.

FIG. 13 is a flowchart for describing the method for controlling the image forming apparatus.

FIG. 14 is a diagram for describing the state of memory management.

DESCRIPTION OF THE EMBODIMENTS

A best mode for implementing an exemplary embodiment of the present invention will be described with reference to the drawings.

<Description of System Configuration>

Figure 1:
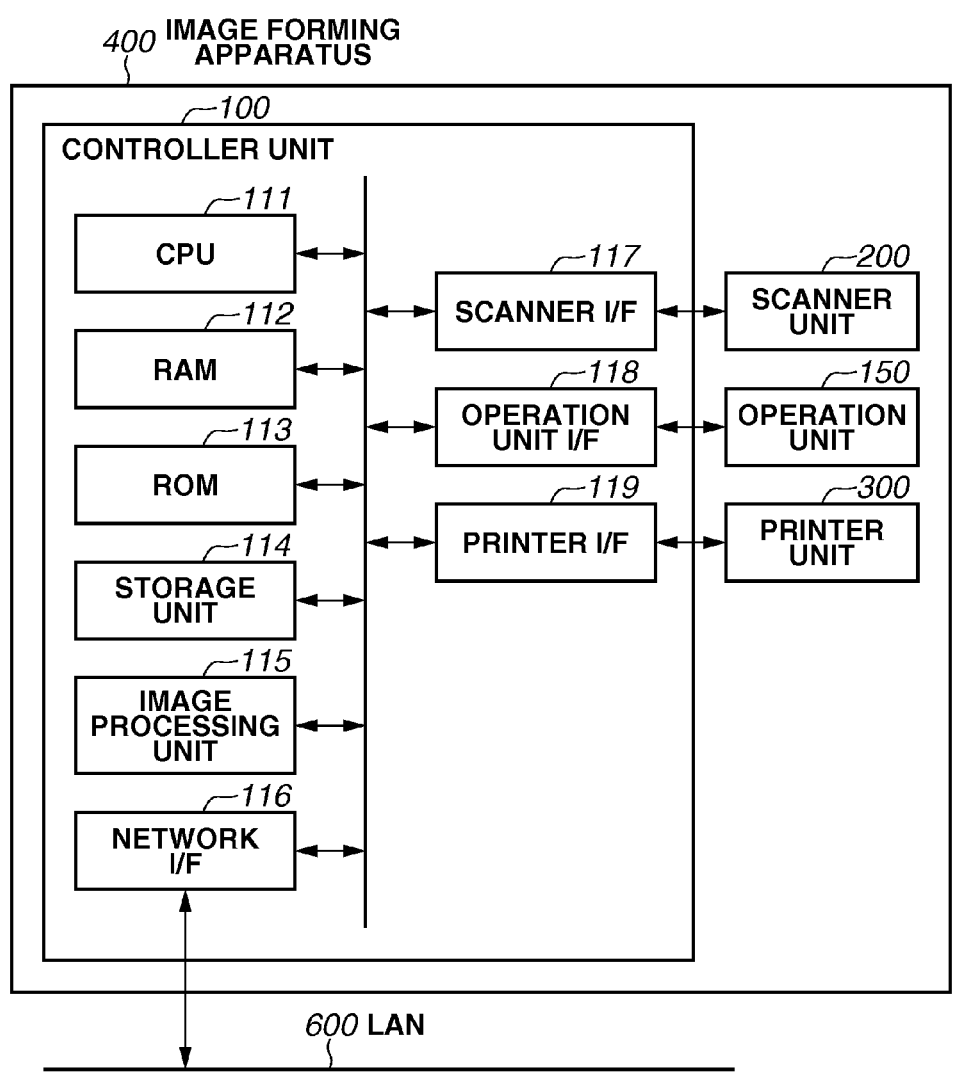
FIG. 1 is a block diagram illustrating a configuration of an image forming apparatus.

FIG. 1 is a block diagram for describing a configuration of an image forming apparatus according to an exemplary embodiment. The configuration will be described with emphasis on a controller unit 100 which controls a scanner unit 200, an operation unit 150, and a printer unit 300.

In FIG. 1, the controller unit 100 is connected with the scanner unit 200 which is an image input device, and controls input of image information. The controller 100 is also connected to a local area network (LAN) 600 via which the controller 100 transmits a transmission job. The controller unit 100 is further connected with the printer unit 300 which is an image output device, and controls output of image information. The controller unit 100 controls the scanner unit 200 to read image data of a document and controls the printer unit 300 to provide a copy function.

A central processing unit (CPU) 111 controls an operation of the image forming apparatus 400. The CPU 111 operates based on a program stored in a random access memory (RAM) 112. A read-only memory (ROM) 113 is a boot ROM. A system boot program is stored in the ROM 113.

A storage unit 114 includes a nonvolatile storage device, such as a hard disk. System software, image data, and a program for controlling the operation of the image forming apparatus 400 are stored in the storage unit 114. The programs stored in the ROM 113 and the storage unit 114 are loaded into the RAM 112, and the CPU 111 controls the operation of the image forming apparatus 400 based on the programs.

An image processing unit 115 performs image correction on image data input from a scanner interface (I/F) 117. A network I/F 116 is connected to the LAN 600 and controls input and output of various types of information via a network.

The scanner I/F 117 is an image input device that connects the scanner unit 200 with the controller unit 100, and performs synchronous/asynchronous conversion on image data. An operation unit I/F 118 is an interface that connects the operation unit 150 with the controller unit 100. The operation unit I/F 118 outputs image data to be displayed on the operation unit 150 to the operation unit 150.

The operation unit I/F 118 transmits information input from the operation unit 150 by a user to the CPU 111. A printer I/F 119 connects the printer unit 300 serving as an image output device with the controller unit 100. The printer I/F 119 performs synchronous/asynchronous conversion on image data and image processing for print output.

The operation unit 150 includes an input device for the user to issue an execution instruction of a function of the image forming unit 400 and to set an operation setting when executing the function. The operation unit 150 includes a display device for notifying the user of a state of the image forming apparatus 400.

[Configuration of Scanner Unit 200]

Figure 2:
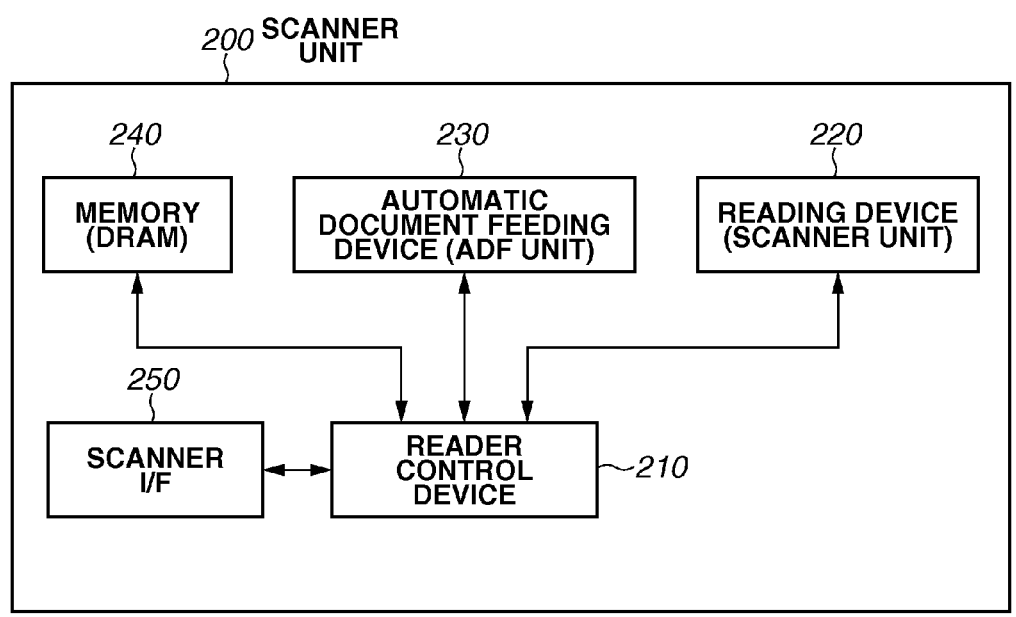
FIG. 2 is a block diagram illustrating an exemplary embodiment of a scanner unit.

FIG. 2 is a block diagram illustrating an exemplary embodiment of the scanner unit 200 illustrated in FIG. 1.

In FIG. 2, the scanner unit 200 includes a reader control device 210, an automatic document feeding device (ADF unit) 230, a reading device (scanner unit) 220, a memory (dynamic random access memory (DRAM) 240, and a scanner I/F 250. The reader control device 210 functions as a read control unit. The reader control device 210 controls two-sided reading of a document by a first reading unit and a second reading unit, and meanwhile determines whether the back side of the document being read in parallel is a blank page. Image data based on the two-sided reading of the document by the first and second reading units is temporarily stored in the memory 240. The CPU 111 of the controller unit 100 also performs processing for receiving the image data stored in the memory 240 from the reader control device 210. The reader control device 210 further has a function for notifying the CPU 111 of the determination result of whether a blank page is detected.

The reading device 220 is an image reading unit that reads a document placed on a document positioning plate. The reading device 220 includes an optical scanning system including an exposure lamp, a mirror, and a lens, and an image sensor for reading and converting a document image into an electrical signal. Examples of the image sensor include charge-coupled device (CCD) and complementary metal-oxide semiconductor (CMOS) image sensors.

The automatic document feeding device 230 is a document conveyance unit that conveys documents one by one from a document stack placed on a document stacking tray. The automatic document feeding device 230 includes a feeding roller, a discharge roller, and a document detection sensor. In the scanner unit 200 supporting a two-sided simultaneous document reading function, an image sensor for reading an image on the back side of a document is arranged on a document conveyance path of the automatic document feeding device (ADF unit) 230. The reader control device 210 is a control unit that controls the scanner unit 200. The reader control device 210 is connected with the automatic document feeding device 230, the reading device 220, the memory 240, and the scanner I/F 250.

The reader control device 210 receives a request from the controller unit 100 and controls the automatic document feeding device 230 and the reading device 220. The reader control device 210 performs image processing on read image data before transferring the image data to the controller unit 100 via the scanner I/F 250. Examples of the image processing include color shift correction, brightness correction, and blank sheet detection.

The reader control device 210 stores the image data read by the reading device 220 and the automatic document feeding device 230 into the memory 240 if needed. The reader control device 210 reads an image from the memory 240 after receiving a request from the controller unit 100 and transfers the image data to the controller unit 100. The reader control device 210 can perform variable magnification processing as image processing after the reading of the image from the memory 240.

[Configuration of Printer Unit 300]

Figure 3:
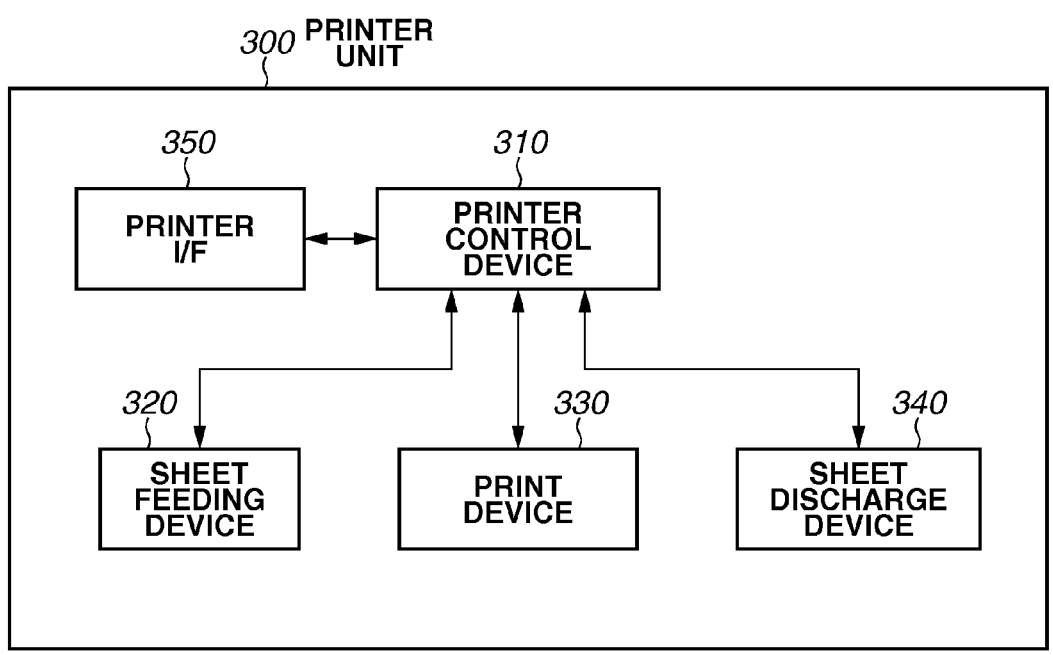
FIG. 3 is a block diagram illustrating an exemplary embodiment of a printer unit illustrated in FIG. 1.

FIG. 3 is a block diagram illustrating an exemplary embodiment of the printer unit 300 illustrated in FIG. 1.

In FIG. 3, the printer unit 300 includes a printer control device 310, a sheet feeding device 320, a print device 330, a sheet discharge device 340, and a printer I/F 350. The sheet feeding device 320 includes sheet cassettes for print sheets to be stacked thereon and a sheet conveyance device that conveys the sheets from the sheet cassettes to the print device 330.

The print device 330 includes a photosensitive drum for a latent image to be formed thereon, an optical system that forms the latent image on the photosensitive drum, a developing device that forms a toner image on the photosensitive drum, and a fixing device that transfers and fixes the toner image on the photosensitive drum to a print sheet. The optical system includes a laser device, a lens, and a mirror.

The sheet discharge device 340 includes a sheet discharge tray for printed sheets to be stacked thereon, a discharge roller that conveys a sheet printed by the print device 330 to the sheet discharge tray, and a post-processing device that performs finishing processing, such as stapling and punching, on the printed sheets.

The printer control device 310 is connected with the sheet feeding device 320, the print device 330, the sheet discharge device 340, and the printer I/F 350. Via the printer I/F 350, the printer control device 310 transmits a request from the controller unit 100 and image data transferred from the controller unit 100 to the print device 330 to perform image formation on a print sheet.

[Cross-Sectional View of Image Forming Apparatus 400]

Figure 4:
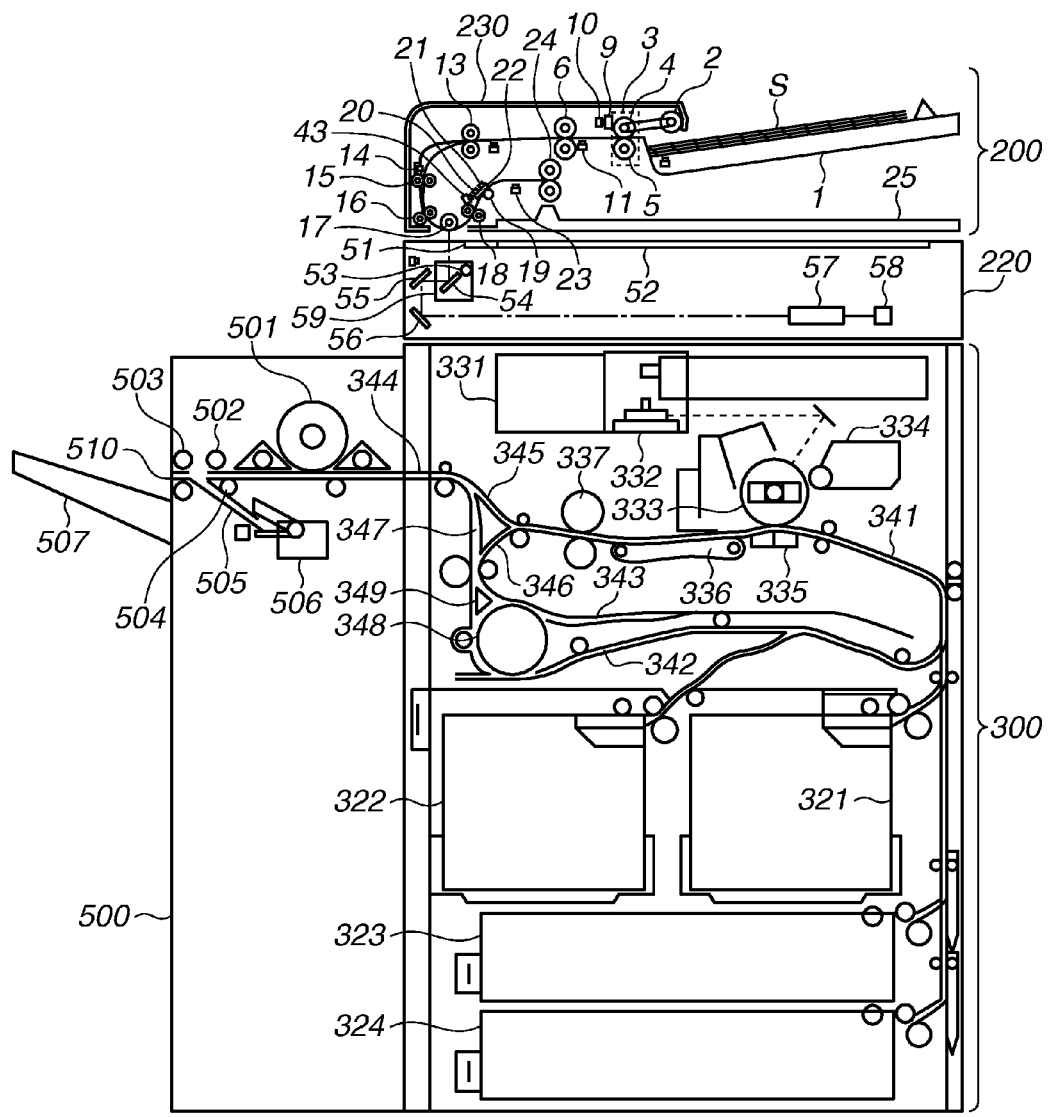
FIG. 4 is a cross-sectional view illustrating the configuration of the image forming apparatus illustrated in FIG. 1.

FIG. 4 is a cross-sectional view for describing the configuration of the image forming apparatus 400 illustrated in FIG. 1.

The scanner unit 200 will be described.

In FIG. 4, the scanner unit 200 has a fixed reading mode and a feeding-reading mode. The fixed reading mode refers to a method in which in a case where the user presses a start key 152 to be described below without setting a document on a document tray 1, a front side CCD line sensor 58 reads a document set on a pressing plate glass 52. An optical motor (not illustrated) is driven to move a front side reading unit 59 to slide to the right direction while reading the document. The ADF unit 230 and a back side CCD line sensor 20 are not used.

The feeding-reading mode refers to a method in which the front side reading unit 59 is fixed and the document is conveyed for reading. The ADF unit 230 includes the document tray 1 and a pickup roller 2. The document tray 1 is an elevatable tray on which a document stack including at least one sheet or more is placed. The pickup roller 2 feeds the topmost document of the document stack into the inside of the ADF unit 230.

Before conveyance start of the document, the pickup roller 2 is lowered and a lifter motor (not illustrated) is driven to lift up the document tray 1. When the topmost document of the document stack reaches a feed position, a sheet surface detection flag 9 rotates in an interlocking manner with the pickup roller 2 in contact with the topmost document of the document stack, and blocks a sheet surface detection sensor 10 to output "on." This stops the lifting of the document tray 1. When a feeding operation is started, the document fed by the pickup roller 2 is separated into one sheet by the action of a separation roller pair 3 including a feed roller 4 and a retard roller 5. The separation is implemented by a known retard separation technique.

The separated document is conveyed by a drawing roller pair 6 and a conveyance roller pair 13 to pass a post-separation sensor 11 and a pre-registration sensor 14, and abutted against a registration roller pair 15. This loops the document to cancel a skew of the document due to the conveyance. The document passed through the registration roller pair 15 is conveyed toward a feeding reading glass 51 and fed to a platen upstream roller pair 16 and a platen roller 17.

The platen roller 17 is in contact with the feeding-reading glass 51. The front side of the document passing the platen roller 17 is irradiated by a light source lamp 53. The reflected light is read by the front side CCD line sensor 58 via mirrors 54, 55, and 56, and a lens 57, whereby a front-side image of the document can be read.

The document fed by the platen roller 17 is passed through a platen downstream roller pair 18 and fed to a back side reading roller 19. The back side reading roller 19 is in contact with a moving glass 22. In a two-sided reading mode, the back side of the document passing the back side reading roller 19 is irradiated by a light source lamp 21. The reflected light is read by the back side CCD line sensor 20, whereby a back-side image can be read.

The document fed by the back side reading roller 19 passes a sheet discharge sensor 23 and is discharged to a document discharge tray 25 by a discharge roller pair 24. Image data output from the front side CCD line sensor 58 and the back side CCD line sensor 20 is subjected to predetermined processing, and then stored into the memory 240 if needed. The image data stored in the memory 240 is read in response to a request from the controller unit 100 and then transferred to the controller unit 100.

The printer unit 300 will be described.

The printer unit 300 includes a laser driver 331 which drives a laser light emission unit 332. The laser driver 331 causes the laser light emission unit 332 to emit laser light according to image data output from the controller unit 100. A photosensitive drum 333 is irradiated with the laser light, whereby a latent image according to the laser light is formed on the photosensitive drum 333. A developing device 334 applies a developer to the latent image portion of the photosensitive drum 333.

The printer unit 300 includes cassettes 321, 322, 323, and 324 each having a drawer shape as the sheet feeding device 320. The user pulls out each cassette, replenishes the pulled-out cassettes with sheets, and closes the cassette.

The printer unit 300 feeds and conveys a recording sheet from any one of the cassettes 321, 322, 323, and 324 to a transfer unit 335 via a conveyance path 341. The transfer unit 335 transfers the developer applied to the photosensitive drum 333 to the recording sheet. The recording sheet bearing the developer is conveyed by a conveyance belt 336 to a fixing unit 337. The fixing unit 337 fixes the developer to the recording sheet by heat and pressure.

The recording sheet passed through the fixing unit 337 is then discharged through conveyance paths 345 and 344. To discharge the recording sheet with the printed side reversed, the recording sheet is guided to conveyance paths 346 and 348, and then conveyed in a reverse direction through a conveyance path 347 and the conveyance path 344.

If two-sided recording is set, the recording sheet passed through the fixing unit 337 is guided by a flapper 349 from the conveyance path 346 to a conveyance path 343. The recording sheet is then conveyed in a reverse direction and guided by the flapper 349 to the conveyance path 348 and a sheet re-feeding conveyance path 342. The recording sheet guided to the sheet re-feeding conveyance path 342 is passed through the conveyance path 341 at the foregoing timing and fed to the transfer unit 335. The recording sheet discharged from the conveyance path 344 is conveyed to a finishing unit 500 regardless of whether one-sided or two-sided recording.

The recording sheet conveyed to the finishing unit 500 is initially fed to a buffer unit 501. In the buffer unit 501, the conveyed recording sheet is wound around a buffer roller for buffering depending on the situation. For example, if it takes long to perform processing downstream, such as stapling, the buffer unit can be used to maintain constant the conveyance speed of recording sheets conveyed from the main unit. This can contribute to improved throughput.

The recording sheet is then passed through a conveyance path 510 and discharged to a discharge tray 507 by an upstream discharge roller pair 502 and a downstream discharge roller pair 503.

In a stapling mode, the recording sheet conveyed by the upstream discharge roller pair 502 is pulled back by a knurled belt 504 and discharged to a stack tray 505 immediately after the trailing edge of the recording sheet has passed through the upstream discharge roller pair 502. After a predetermined number of recording sheets are stacked, a stapling unit 506 performs stapling processing. The stapled recording sheets are then discharged to the discharge tray 507 by the downstream discharge roller pair 503.

For shift sorting, the sheets stacked on the stack tray 505 are laterally shifted and discharged to the discharge tray 507 to express a break between copies. For normal stapling, recording sheets discharged from the conveyance path 344 are stacked on the stack tray 505 and then stapled.

[Outline of Image Processing in Reader Control Device 210]

Figure 5:
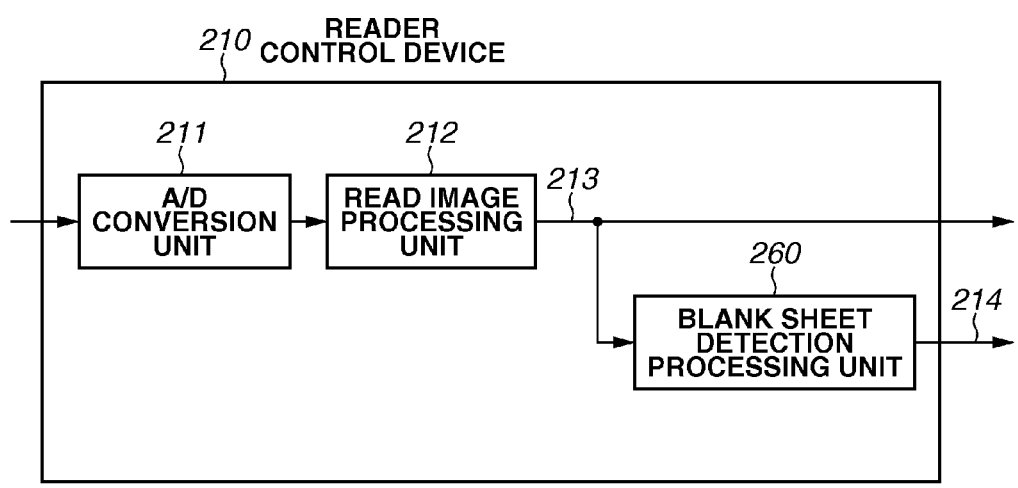
FIG. 5 is a block diagram illustrating a configuration of a reader control device illustrated in FIG. 2.

FIG. 5 is a block diagram for describing a configuration of the reader control device 210 illustrated in FIG. 2. The processing blocks may be separately provided for the output from the front side CCD line sensor 58 and for the output from the back side CCD line sensor 20. The front side CCD line sensor 58 and the back side CCD line sensor 20 output analog image data.

In FIG. 5, an analog-to-digital (A/D) conversion unit 211 digitally converts the analog image data. A read image processing unit 212 performs processing, such as shading correction for adjusting the levels of highlight portions (white) and dark portions (black) of the read image data, modulation transfer function (MTF) correction, and high-frequency suppression processing.

A blank sheet detection processing unit 260 refers to the image data 213 processed by the read image processing unit 212 and determines whether the read image data is blank.

The reader control device 210 stores the image data 213 processed by the read image processing unit 212 and a blank sheet detection result 214 obtained by the blank sheet detection processing unit 260 into the memory 240.

[Blank Sheet Detection Processing Unit 260]

Figure 6:
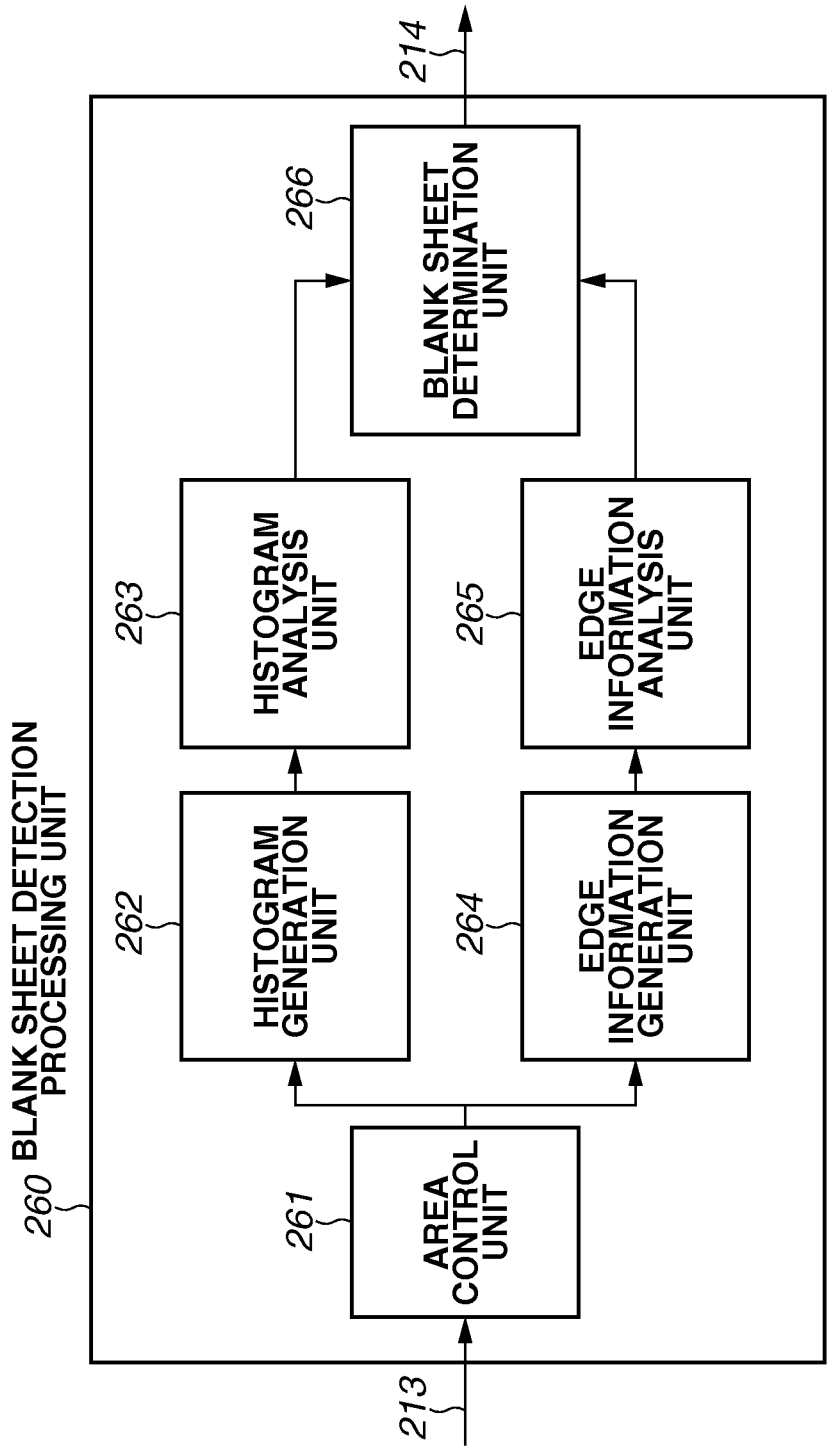
FIG. 6 is a bock diagram illustrating an internal configuration of a blank sheet detection processing unit illustrated in FIG. 5.

FIG. 6 is a block diagram illustrating an internal configuration of the blank sheet detection processing unit 260 illustrated in FIG. 2. The blank sheet detection processing unit 260 is connected to a not-illustrated register. The register stores a control parameter. The blank sheet detection processing unit 260 operates by reading the control parameter set in the register.

In FIG. 6, the digital image data 213 is output from the read image processing unit 212. The blank sheet detection result 214 of the blank sheet detection processing unit 260 is stored into the memory 240. An area control unit 261 controls areas for generating a histogram and edge information from the input image data 213.

A histogram generation unit 262 generates a histogram of a plurality of areas by using the image data 213. A histogram analysis unit 263 determines whether a document image is blank based on the histogram generated by the histogram generation unit 262.

An edge information generation unit 264 counts edges in the plurality of areas by using the image data 213. An edge information analysis unit 265 determines whether the document image is blank based on the number of edges generated by the edge information generation unit 264. A blank sheet determination unit 266 refers to the result of a plurality of threshold parameters used in the histogram analysis unit 263 and the edge information analysis unit 265, and calculates a determination result for determining whether the document is a blank sheet.

[Operation Unit 150]

Figure 7:
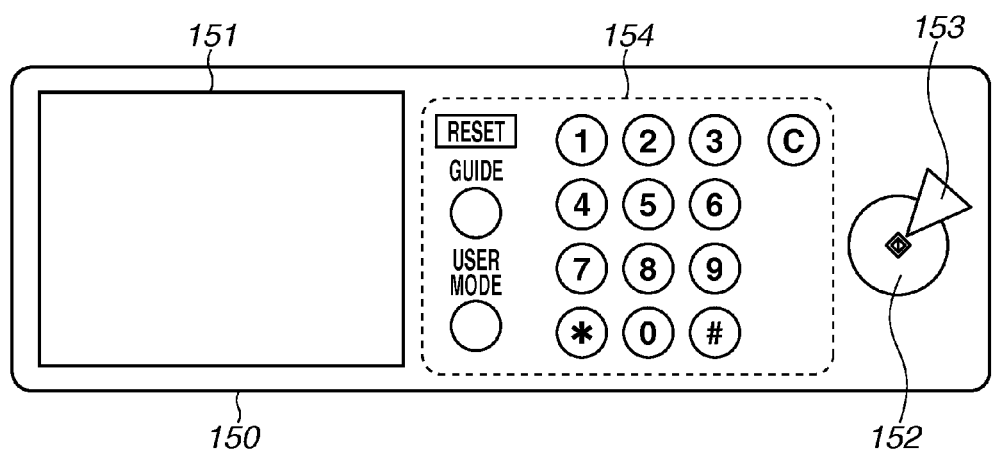
FIG. 7 is a plan view illustrating a configuration example of an operation unit illustrated in FIG. 1.

FIG. 7 is a plan view illustrating a configuration example of the operation unit 150 illustrated in FIG. 1.

In FIG. 7, a liquid crystal operation panel 151 is a combination of a liquid crystal display and a touch panel. The liquid crystal operation panel 151 displays an operation screen. When the user presses a display key, the liquid crystal operation panel 151 transmits the information to the controller unit 100. The liquid crystal operation panel 151 is used for most of mode settings and status display.

A start key 152 is used to start an operation for reading and printing a document image and to issue a start instruction for other functions. The start key 152 includes green and red, two color light emitting diodes (LEDs). The green LED is lit to indicate that an operation can be started. The red LED is lit to indicate that an operation is not able to be started. A stop key 153 functions to stop an operation at work. A hard key group 154 includes a numerical keypad, a clear key, a reset key, a guide key, and a user mode key.

[Image Transmission Processing Flow]

Figure 8:
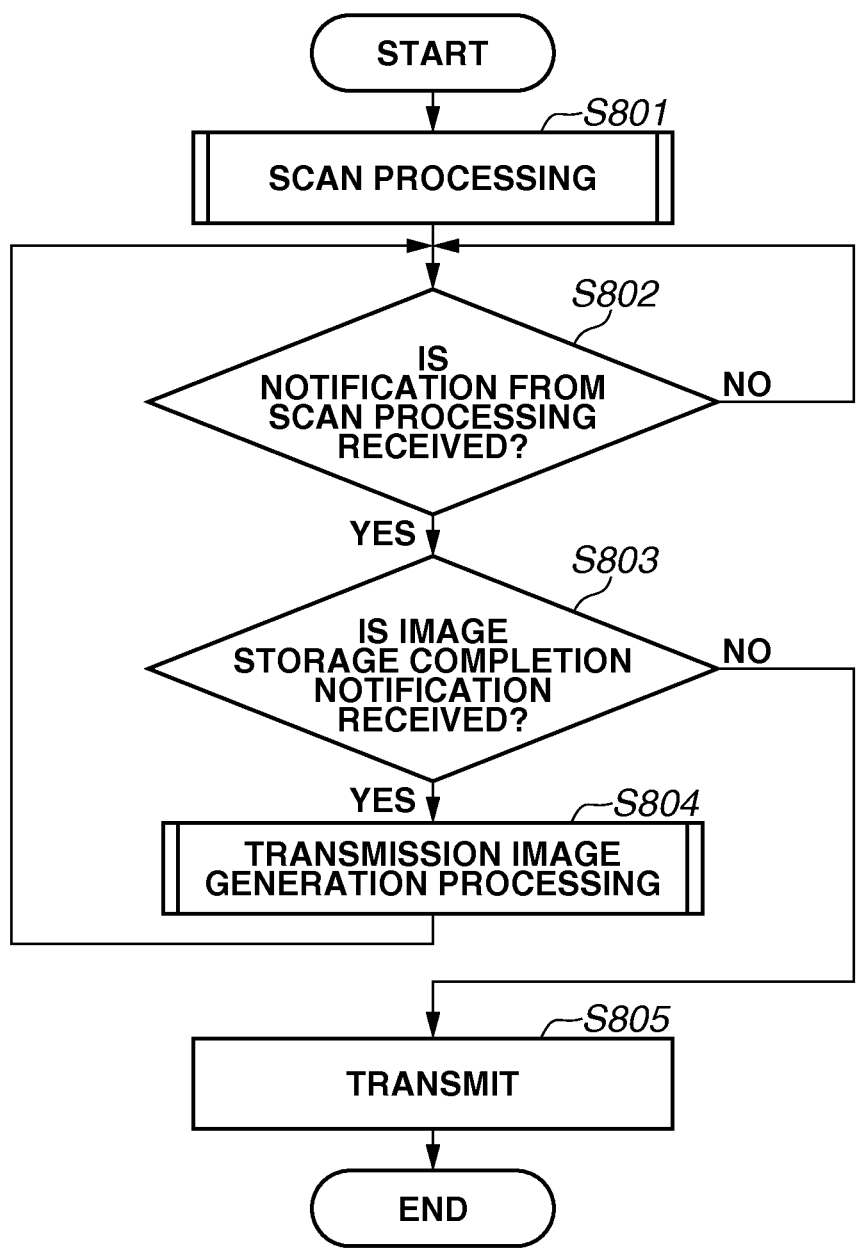
FIG. 8 is a flowchart for describing a method for controlling the image forming apparatus.

FIG. 8 is a flowchart for describing a method for controlling the image forming apparatus 400 according to the present exemplary embodiment. According to the present exemplary embodiment, image data read by the scanner unit 200 is converted into a transmission image and the transmission image is transmitted to a transmission destination. The processing illustrated in the flowchart is performed by the CPU 111 of the controller unit 100 successively reading programs stored in the ROM 113 and the storage unit 114 into the RAM 112 and executing the programs. The user performs setting from a mode setting screen of a transmission function on the liquid crystal operation panel 151 illustrated in FIG. 7 and presses the start key 152 to start the processing.

In step S801, the CPU 111 activates scan processing to start reading a document. In step S802, the CPU 111 determines whether a notification from the scan processing of step S801 is received. In step S802, in a case where the CPU 111 determines that a notification from the scan processing is received (YES in step S802), the processing proceeds to step S803.

On the other hand, in step S802, in a case where the CPU 111 determines that a notification from the scan processing is not received (NO in step S802), the CPU 111 waits for a notification from the scan processing.

In step S803, the CPU 111 determines whether an image storage completion notification is received. The image storage completion notification is issued when the scan processing completes storing a document image in the HDD (storage unit 114). In step S803, in a case where the CPU 111 determines that the image storage completion notification is received (YES in step S803), the processing proceeds to step S804.

In step S803, in a case where the CPU 111 determines that the received notification is not the image storage completion notification (NO in step S803), it means that the reading of the entire document is completed. The processing then proceeds to step S805.

In step S804, the CPU 111 converts the stored image received in step S803 (image read by the scan processing) into an image specified by a transmission setting. The processing then returns to step S802 to wait for a notification from the scan processing. In step S805, the CPU 111 transmits the image to the transmission destination specified by the transmission setting of the operation unit 150, and ends the processing.

According to the operation illustrated in the flowchart, the images read by the scanner unit 200 are described to be all converted into transmission-specified images before transmission. However, the CPU 111 may perform control for transmission every time when a transmission image is generated.

[Two-Sided Reading Sequence]

Figure 9:
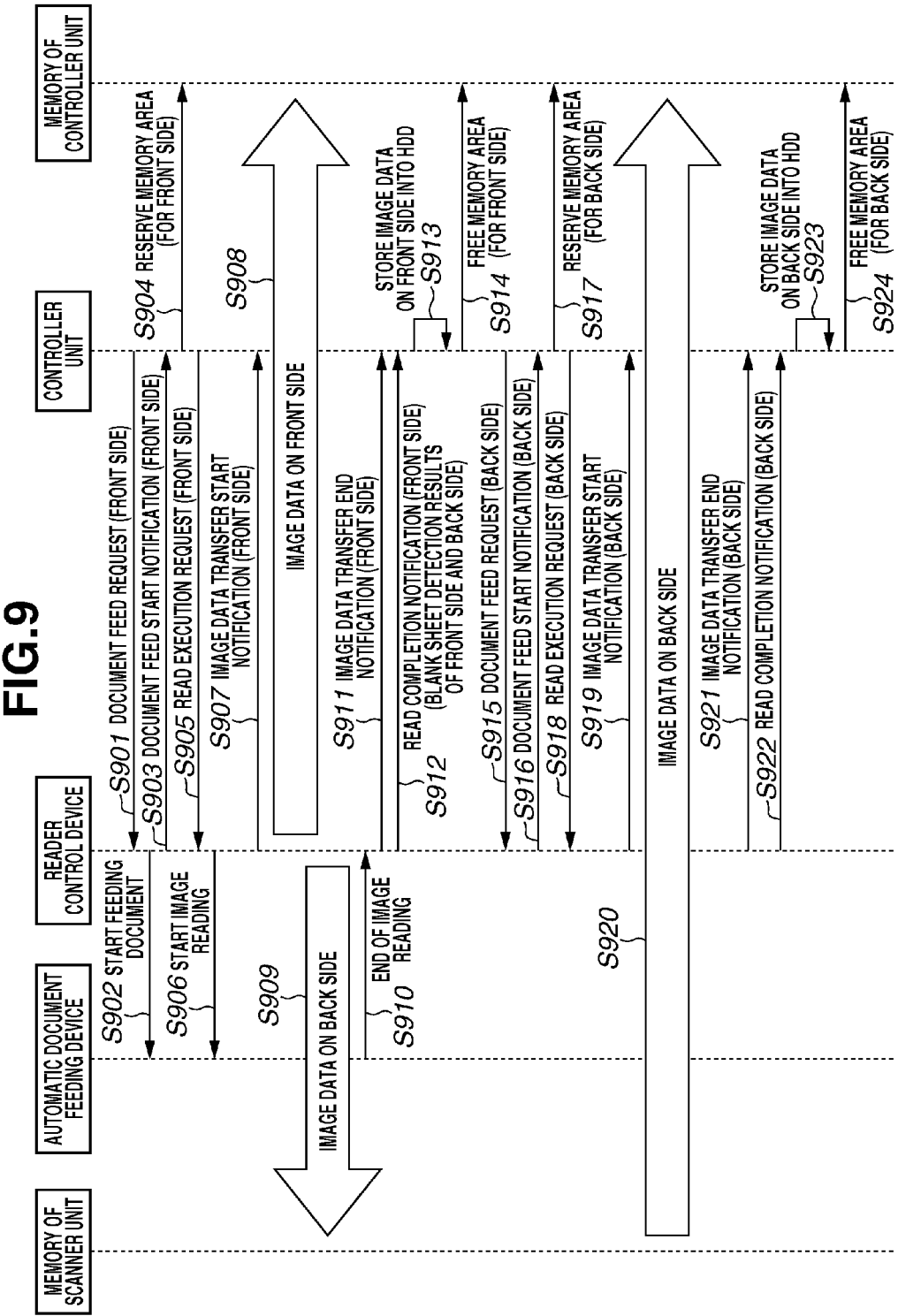
FIG. 9 is a diagram for describing a document reading sequence.

FIG. 9 is a diagram for describing a document reading sequence of the image forming apparatus 400 according to the present exemplary embodiment. According to the present exemplary embodiment, both sides of a document placed on the automatic document feeding device 230 is read by the scanner unit 200 which is capable of two-sided simultaneous reading. More specifically, FIG. 9 corresponds to a sequence example schematically illustrating exchanges between the scanner unit 200 and the controller unit 100 in image reading.

In step S901, the controller unit 100 issues a document feed request for a front side to the reader control device 210.

The document feed request specifies an operation mode of the automatic document feeding device 230.

In step S902, the reader control device 210 receives the document feed request from the controller unit 100, determines the specified operation mode, and instructs the automatic document feeding device 230 to start feeding a document. In step S903, the reader control device 210 notifies the controller unit 100 of the start of the document feeding (document feed start notification). By the document feed start notification, the controller unit 100 is notified of information about an abnormality at the time of feeding, a document size, and the presence or absence of the next document. In step S904, the controller unit 100 receives the document feed start notification and reserves an area (memory area) for receiving image data read by the scanner unit 200 into the controller unit 100 on the memory (RAM 112).

In step S905, having reserved the memory area for receiving the image data, the controller unit 100 notifies the reader control device 210 of a read execution request for the front side. The read execution request specifies parameters required for the image processing and image reading performed by the scanner unit 200. Examples of the parameters include a scan start position and a variable magnification ratio.

In step S906, the reader control device 210 receives the read execution request from the controller unit 100 and starts image reading performed by the automatic document feeding device 230. The automatic document feeding device 230 conveys the document, and the front side CCD line sensor 58 and the back side CCD line sensor 20 start reading the document. In step S907, the reader control device 210 notifies the controller unit 100 of a start of transfer of image data, which indicates the completion of preparation for the read execution request from the controller unit 100.

In step S908, the reader control device 210 performs image processing required for image data read by the front side CCD line sensor 58, and transfers the image data on the front side to the controller unit 100. The blank sheet detection processing unit 260 of the reader control device 210 performs blank sheet detection processing on the front side. The blank sheet detection result 214 of the blank sheet detection processing unit 260 is stored into the memory 240 of the scanner unit 200.

In step S909, the reader control device 210 stores image data read by the back side CCD line sensor 20 into the memory 240 of the scanner unit 200. The blank sheet detection processing unit 260 performs image processing required for the image data on the back side, such as the blank sheet detection processing. The image data is stored into the memory 240 with the blank sheet detection result 214. In step S910, when the reading of the document by the front side CCD line sensor 58 and the back side CCD line sensor 20 is completed, the automatic document feeding device 230 notifies the reader control device 210 of the end of the image reading.

In step S911, in response to end of the transfer of the image data to the controller unit 100 in step S908, the reader control device 210 notifies the controller unit 100 of the end of transfer of the image data on the front side.

In step S912, in response to end of the image reading in step S910 and end of the transfer of the image data to the controller unit 100 in step S908, the reader control device 210 notifies the controller unit 100 of the completion of the reading on the front side (read completion notification). The reader control device 210 notifies the controller unit 100 of the blank sheet detection results 214 of the front side and the back side, stored in the memory 240.

In step S913, upon receiving the notification of the end of transfer of the image data on the front side in step S911 from the reader control device 210, the controller unit 100 stores the image data on the front side transferred to the memory (RAM 112) of the controller unit 100 into the HDD (storage unit 114). In step S914, after completing storing the image data into the storage unit 114 in step S913, the controller unit 100 frees the memory area for receiving the image data on the front side (memory area in the RAM 112) reserved in step S904.

In step S915, the controller unit 100 issues a document feed request for the back side to the reader control device 210. According to the sequence, the controls on the front side and the back side are separately described for the sake of simplicity. However, the controller unit 100 may issue the document feed request for the back side when receiving the document feed start notification of the front side in step S903.

The image data on the back side is already stored in the memory 240 of the scanner unit 200 in step S909. In step S916, the reader control device 210 therefore notifies the controller unit 100 of the start of the document feeding on the back side (document feed start notification). According to the sequence, the controls on the front side and the back side are separately described for the sake of simplicity. However, the reader control device 210 may issue the document feed start notification of the back side when receiving the notification of the end of the image reading in step S910.

In step S917, the controller unit 100 receives the document feed start notification of the back side, and reserves an area (memory area) for receiving the image data read by the scanner unit 200 into the controller unit 100 on the memory (RAM 112). In step S918, after reserving the memory area for receiving the image data, the controller unit 100 notifies the reader control device 210 of a read execution request for the back side.

The image data on the back side is already stored in the memory 240 of the scanner unit 200 in step S909. In step S919, the reader controller device 210 therefore notifies the controller unit 100 of the start of transfer of the image data on the back side, which indicates the completion of preparation, in response to the read execution request for the back side from the controller unit 100 in step S918. In step S920, the reader control device 210 transfers the image data on the back side stored in the memory 240 of the scanner unit 200 to the controller unit 100.

In step S921, in response to end of the transfer of the image data on the back side to the controller unit 100 in step S920, the reader control device 210 notifies the controller unit 100 of the end of transfer of the image data on the back side. In step S922, in response to the end of the transfer of the image data on the back side to the controller unit 100 in step S921, the reader control device 210 notifies the controller unit 100 of the completion of the reading of the back side (read completion notification).

In step S923, upon receiving the notification of the end of transfer of the image data on the back side in step S921 from the reader control device 210, the controller unit 100 stores the image data on the back side transferred to the memory (RAM 112) of the controller unit 100 into the HDD (storage unit 114). In step S924, upon completing storing the image data into the storage unit 114 in step S923, the controller unit 100 frees the memory area for receiving the image data on the back side (memory area on the RAM 112) reserved in step S917.

[Transmission Image Generation Processing Sequence]

Figure 10:
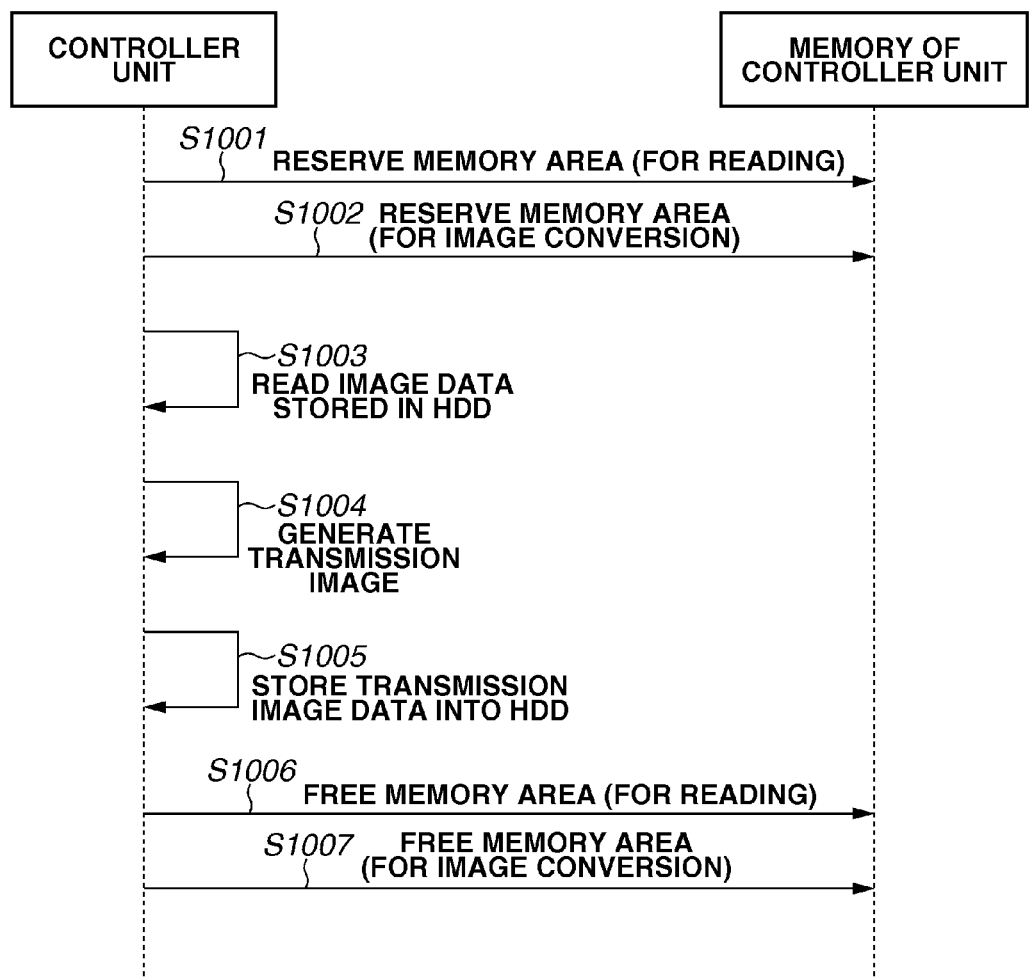
FIG. 10 is a flowchart for describing the method for controlling the image forming apparatus.

FIG. 10 is a flowchart for describing the method for controlling the image forming apparatus 400 according to the present exemplary embodiment. According to the present exemplary embodiment, the flowchart is a sequence example schematically illustrating transmission image generation processing of the controller unit 100 illustrated in FIG. 1.

In step S1001, the controller unit 100 reserves a memory area for reading image data stored in the storage unit 114 of the controller unit 100 on the memory (RAM 112).

In step S1002, the controller unit 100 reserves a memory area for storing image data image-converted by the image processing unit 115 of the controller unit 100 on the memory (RAM 112). In step S1003, the controller unit 100 reads the image data stored in the HDD (storage unit 114) into the memory area reserved in step S1001. In step S1004, the image processing unit 115 performs image processing based on the contents specified by the transmission setting to generate a transmission image (transmission image data). Examples of the image processing include resolution conversion and image format conversion.

In step S1005, the controller unit 100 stores the transmission image data generated in step S1004 into the HDD (storage unit 114). In step S1006, upon completing storing the transmission image data, the controller unit 100 frees the memory area reserved in step S1001. In step S1007, the controller unit 100 frees the memory area reserved in step S1002.

The generation of a transmission image is performed in the flow described above.

[Memory Management by Controller Unit 100]

The controller unit 100 of the image forming apparatus 400 uses the scanner unit 200 to provide a scan function for controlling input of image information. The controller unit 100 is connected with the LAN 600 and provides a transmission function for transmitting an image via the LAN 600. The controller unit 100 uses the printer unit 300 to provide a print function for controlling output of image information. The controller unit 100 controls the scanner unit 200 to read image data of a document and controls the printer unit 300 to provide a copy function. The controller unit 100 manages resources, such as the scanner unit 200, the printer unit 300, and the memory (RAM 112), and operates such functions.

FIG. 11 is a diagram schematically illustrating a state of memory management performed by the controller unit 100. Specifically, FIG. 11 illustrates an example where there are provided three pages of memory for image data when performing the processing illustrated in FIGS. 8, 9, and 10. The rectangles represent reserved periods for respective pieces of processing. The memory reservation is performed in order from top to bottom and left to right in the diagram.

In FIG. 11, a reception memory area (1) for receiving image data on the front side of a first document is reserved and reading of the first document is performed. A reception memory area (2) for receiving image data on the back side of the first document is reserved.

When the image data on the front side of the first document is stored into the storage unit 114, the reception memory area (1) for receiving the image data on the front side is freed. When the reception memory area (1) for receiving the image data on the front side of the first document is freed, memory areas for generating a transmission image of the image data on the front side of the first document (image reading memory area (3) and transmission image generation memory area (4)) are reserved.

When the image data on the back side of the first document is stored into the storage unit 114, the reception memory area (2) for receiving the image data on the back side is freed. When the reception memory area (2) for receiving the image data on the back side of the first document is freed, a reception memory area (5) for receiving image data on the front side of a second document is reserved and reading of the second document is performed.

When the generation of the transmission image of the image data on the first side of the first document is completed and the transmission image is stored into the storage unit 114, the memory areas for generating the transmission image of the image data on the front side of the first document (image reading memory area (3) and transmission image generation memory area (4)) are freed. When the image reading memory area (3) and the transmission image generation memory area (4) for generating the transmission image of the image data on the front side of the first document are freed, memory areas for generating a transmission image of the image data on the back side of the first document (image reading memory area (6) and transmission image generation memory area (7)) are reserved.

When the image data on the front side of the second document is stored into the storage unit 114, the reception memory area (5) for receiving the image data on the front side is freed. When the reception memory area (5) for receiving the image data on the front side of the second document is freed, a reception memory area (8) for receiving the image data on the back side of the second document is reserved.

When the generation of the transmission image of the image data on the back side of the first document is completed and the transmission image is stored into the storage unit 114, the memory areas for generating the transmission image of the image data on the back side of the first document (image reading memory area (6) and transmission image generation memory area (7)) are freed. When the image reading memory area (6) and the transmission image generation memory area (7) for generating the transmission image of the image data on the back side of the first document are freed, memory areas for generating a transmission image of the image data on the front side of the second document (image reading memory area (9) and transmission image generation memory area (10)) are reserved.

When the image data on the back side of the second document is stored into the storage unit 114, the reception memory area (8) for receiving the image data on the back side is freed. When the reception memory area (8) for receiving the image data on the back side of the second document is freed, a reception memory area (11) for receiving image data on the front side of a third document is reserved and reading of the third document is performed.

When the generation of the transmission image of the image data on the front side of the second document is completed and the transmission image is stored into the storage unit 114, the memory areas for generating the transmission image of the image data on the front side of the second document (image reading memory area (9) and transmission image generation memory area (10)) are freed. When the image reading memory area (9) and the transmission generation memory area (10) for generating the transmission image of the image data on the front side of the second document are freed, memory areas for generating a transmission image of the image data on the back side of the second document (image reading memory area (12) and transmission image generation memory area (13)) are reserved.

If the image data on the front side of the third document is stored into the storage unit 114, the reception memory area (11) for receiving the image data on the front side is freed. When the reception memory area (11) for receiving the image data on the front side of the third document is freed, a reception memory area (14) for receiving the image data on the back side of the third document is reserved.

The pieces of processing are performed by repeating memory arbitration as described above.

[Scan Processing Flow]

FIG. 12 is a flowchart for describing the method for controlling the image forming apparatus 400 according to the present exemplary embodiment. According to the present exemplary embodiment, the scan processing illustrated in FIG. 8 is performed by the controller unit 100 in the sequence diagram illustrated in FIG. 9. A program related to the processing illustrated in the flowchart is controlled by the CPU 111 of the controller unit 100 by successively reading programs stored in the ROM 113 and the storage unit 114 into the RAM 112 and executing the programs.

In step S1201, the CPU 111 issues a document feed request in either step S901 or step S915 to the reader control device 210.

In step S1202, the CPU 111 determines whether a document feed start notification in either step S903 or step S916 is received from the reader control device 210. In step S1202, in a case where the CPU 111 determines that a document feed start notification is received (YES in step S1202), the processing proceeds to step S1203. In step S1202, in a case where the CPU 111 determines that a document feed start notification is not received (NO in step S1202), the CPU 111 waits for a document feed start notification. In step S1203, the CPU 111 performs image reception processing.

In step S1204, the CPU 111 determines whether a read completion notification in either step S912 or step S922 from the reader control device 210 is received. In step S1204, in a case where the CPU 111 determines that a read completion notification is received (YES in step S1204), the processing proceeds to step S1205. In step S1204, in a case where the CPU 111 determines that a read completion notification is not received (NO in step S1204), the CPU 111 waits for a read completion notification.

In step S1205, the CPU 111 determines whether the read completion notification received in step S1204 is that of the front side. In a case where the read completion notification is determined to be of the front side (YES in step S1205), the processing proceeds to step S1206. In a case where the read completion notification is determined to not be of the front side (NO in step S1205), the processing proceeds to step S1208.

In step S1206, the CPU 111 determines whether the back side is blank. In step S1206, in a case where the CPU 111 determines that the back side is blank (YES in step S1206), the processing proceeds to step S1207. In step S1206, in a case where the CPU 111 determines that the back side is not blank (NO in step S1206), the processing returns to step S1201. The CPU 111 then repeats the processing to receive the image on the back side.

In step S1207, the CPU 111 determines from a setting specified at the time of processing execution whether to receive a blank sheet image. In step S1207, in a case where the CPU 111 determines not to receive a blank sheet image (NO in step S1207), the processing proceeds to step S1208.

In step S1207, in a case where the CPU 111 determines to receive a blank sheet image (YES in step S1207), the processing returns to step S1201. The CPU 111 then repeats the processing to receive the image on the back side.

In step S1208, the CPU 111 determines from the information notified by the document feed start notification whether all documents placed on the automatic document feeding device (ADF unit) 230 have been read. In step S1208, in a case where the CPU 111 determines that all the documents have been read (YES in step S1208), the processing proceeds to step S1209. In step S1208, in a case where the CPU 111 determines that all the documents have not been read (NO in step S1208), the processing returns to step S1201. The CPU 111 then repeats the processing. In step S1209, the CPU 111 issues completion notification of the reading of all the documents, and ends the processing.

[Image Reception Processing Flow]

FIG. 13 is a flowchart for describing the method for controlling the image forming apparatus 400 according to the present exemplary embodiment. According to the present exemplary embodiment, the flowchart is a detailed example of the image reception processing illustrated in FIG. 12. A program related to the processing illustrated in the present flowchart is controlled by the CPU 111 of the controller unit 100 successively reading programs stored in the ROM 113 and the storage unit 114 into the RAM 112 and executing the programs.

In step 1301, the CPU 111 reserves a memory area for image reception. In step S1302, the CPU 111 determines whether the memory area for image reception is successfully reserved. In step S1302, in a case where the CPU 111 determines that the memory area for image reception is successfully reserved (YES in step S1302), the processing proceeds to step S1303. In step S1302, in a case where the CPU 111 determines that the memory area for image reception has not been reserved yet (NO in step S1302), the CPU 111 waits until the memory area is successfully reserved.

In step S1303, the CPU 111 issues a read execution request in step S905 to the reader control device 210. In step S1304, the CPU 111 determines whether a read completion notification in step S912 is received from the reader control device 210. In step S1304, in a case where the CPU 111 determines that a read completion notification is received (YES in step S1304), the processing proceeds to step S1305. In step S1304, in a case where the CPU 111 determines that a read completion notification is not received (NO in step S1304), the CPU 111 waits for the reception of a read completion notification.

In step S1305, the CPU 111 stores image data transferred from the reader control device 210 into the memory area reserved in step S1301, and stores the image data into the HDD (storage unit 114). In step S1306, the CPU 111 issues an image storage completion notification which indicates the completion of the storing of the image into the HDD (storage unit 114).

In step S1307, the CPU 111 frees the memory area reserved in step S1301, and ends the processing.

[Memory Management by Controller Unit 100 when not Receiving Blank Sheet Image]

FIG. 14 is a diagram for describing the state of memory management by the controller unit 100. This example schematically illustrates the memory management performed by the controller unit 100 when the back side is detected to be blank by the control illustrated in FIG. 12. In particular, the example deals with a case where the back side of the first document is blank.

In FIG. 14, in a case where the back side of the first document is detected to be blank, the reception memory area (2) for receiving image data does not need to be reserved. Since the transmission image of the image data on the back side of the first document is not be generated, the memory areas for generating the transmission image (image reading memory area (6) and transmission image generation memory area (7)) do not need to be reserved. Consequently, the memory areas for and after the generation of the transmission image of the image data on the front side of the second document can be reserved earlier than the case when the image data on the back side of the first document is received as illustrated in FIG. 11.

The foregoing control can be performed to handle blank sheet images according to the blank sheet detection results of the front and back sides obtained by an image reading apparatus that simultaneously reads both sides and the handling method of blank sheet images specified by the user. The foregoing control also enables effective use of limited memory resources in the image forming apparatus 400. As a result, a user stress-free, highly-convenient image forming apparatus can be provided.

The present invention has been described above in conjunction with a specific exemplary embodiment thereof. The present invention is not limited to the foregoing exemplary embodiment.

Each procedure of an exemplary embodiment of the present invention may be implemented by a personal computer (computer) or other processing unit (CPU or processor) executing software (program) obtained via a network or various recording media.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-034457 filed Feb. 25, 2014, which is hereby incorporated by reference herein in its entirety.

What is claimed is:

1. An image reading apparatus which includes:
    a conveyer that conveys a document;
    a reader that reads both a first side and a second side of the document conveyed by the conveyer;
    a reader controller that determines whether the second side is a blank page based on image data of the second side read by the reader, and notifies a controller of the determination result; and
    the controller, wherein the controller comprises a storage that stores image data transferred by the reader controller,
    wherein, based on the notified determination result indicating that the second side is not a blank page, the controller performs a reserving process for reserving a storage area for the second side of the document in the storage and stores, in the storage area, the image data of the second side transferred by the reader controller, and
    wherein, based on the notified determination result indicating that the second side is a blank page, the controller does not perform a reserving process for reserving a storage area for the second side of the document in the storage and does not store data of the second side.

2. The image reading apparatus according to claim 1, wherein the reader controller comprises a memory that temporarily stores the image data of the second side read by the reader.

3. The image reading apparatus according to claim 1, wherein, in a case where it is set that the controller does not receive the blank page and the notified determination result indicates that the second side is the blank page, the controller does not reserve the storage area for the second side of the document in the storage.

4. A method for controlling an image reading apparatus which includes a reader controller and a controller which comprises a storage that stores image data transferred by the reader controller, the method comprising:
    conveying, by a conveyer, a document;
    reading, by a reader, both a first side and a second side of the document conveyed by the conveyer;
    determining, at the reader controller, whether the second side is a blank page based on image data of the second side read by the reader, and notifying, from the reader controller, a controller of the determination result; and
    controlling the controller,
    wherein, based on the notified determination result indicating that the second side is not a blank page, controlling includes controlling the controller to perform a reserving process for reserving a storage area for the second side of the document in the storage and store, in the storage area, the image data of the second side transferred by the reader controller,
    wherein, based on the notified determination result indicating that the second side is a blank page, controlling includes controlling the controller not to perform a reserving process for reserving a storage area for the second side of the document in the storage, and
    wherein data of the second side is not stored in the storage.

5. A non-transitory storage medium storing a program to cause a computer to perform a method for controlling an image reading apparatus which includes a reader controller and a controller which comprises a storage that stores image data transferred by the reader controller, the method comprising:
    conveying, by a conveyer, a document;
    reading, by a reader, both a first side and a second side of the document conveyed by the conveyer;
    determining, at the reader controller, whether the second side is a blank page based on image data of the second side read by the reader, and notifying, from the reader controller, a controller of the determination result; and controlling the controller, wherein, based on the notified determination result indicating that the second side is not a blank page, controlling includes controlling the controller to perform a reserving process for reserving a storage area for the second side of the document in the storage and store, in the storage area, the image data of the second side transferred by the reader controller, wherein, based on the notified determination result indicating that the second side is a blank page, controlling includes controlling the controller not to perform a reserving process for reserving a storage area for the second side of the document in the storage, and wherein data of the second side is not stored in the storage.

* * * * *